(No Model.)

C. F. JACOBS.
BICYCLE TIRE.

No. 456,702. Patented July 28, 1891.

Witnesses:

Inventor
C. F. Jacobs
Francis W. Parker,
Attorney

UNITED STATES PATENT OFFICE.

CHARLES F. JACOBS, OF CHICAGO, ILLINOIS.

BICYCLE-TIRE.

SPECIFICATION forming part of Letters Patent No. 456,702, dated July 28, 1891.

Application filed June 5, 1891. Serial No. 395,233. (No model.)

*To all whom it may concern:*

Be it known that I, CHARLES F. JACOBS, a citizen of the United States, residing at Chicago, in the county of Cook and State of Illinois, have invented a new and useful Improvement in Bicycle-Tires, of which the following is a full, clear, and exact specification.

My invention relates to bicycle-tires and the like, and has for its object to provide means whereby an elastic or pneumatic tire may be constructed and applied to a bicycle-wheel. It is illustrated in the accompanying drawings, wherein—

Figure 1:
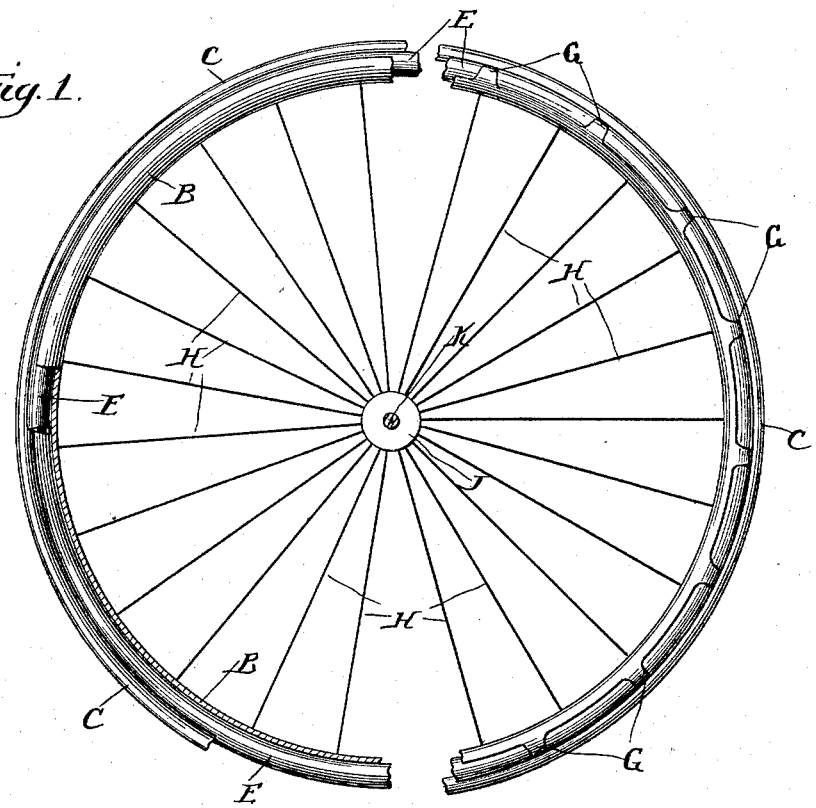
Figure 2:
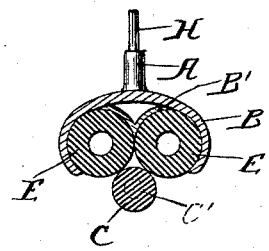
Figure 3:
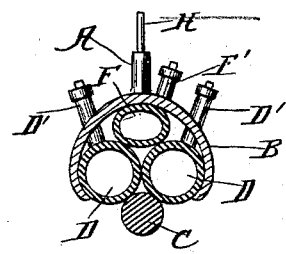

Figure 1 is a side view of a wheel or portions of a wheel, showing modifications. Fig. 2 is a cross-section through the elastic tire. Fig. 3 is a cross-section through a pneumatic tire.

Like parts are indicated by the same letters in all the figures.

K is the axle, J the hub, and H H the spokes of the wheel. B is the rim, which may be of various forms in cross-section, as indicated in Figs. 2 and 3, and into which the spokes are secured either directly or by means of the projecting parts A A. The rim B may have a continuous edge or may be provided with overhanging lips G G.

E E are elastic tubes, having preferably a small central aperture, and C is a bearing-tire adapted to spring over the rim and seat itself in the space between the two tubes. It may be of any desired material and may or may not have a central aperture, as indicated in dotted lines C'. The material of the tubes E E may be as desired, and they might even be solid if sufficiently elastic. There may be more than two of these tubes, as illustrated in Fig. 3, where D D represent tubes adapted for use in pneumatic tires, and F a third similar tube placed above the two principal tubes. These several parts could be somewhat modified, and some removed and others substituted, without departing from the spirit of my invention.

F' is a tube or pipe leading to the tube F, and D' D' are similar pipes leading to the tubes D D. By means of these pipes air may be passed through the said tubes until they are thoroughly inflated.

The rim B may be provided with the inwardly-extending flange or portion B', which may be composed of sheet-iron and the like bent in the form shown and soldered or secured to the inside of the rim, thus serving as a lining in the rim and making two sockets to receive the elastic tires or tubes D D, substantially as shown.

The use and operation of my invention are as follows: The hub, spokes, axle, and such parts are the same as in other such bicycle or similar wheels. The spokes are also secured in the usual manner to the outer rim, though I have shown a projection on the back of the rim, to which the spoke is secured when the rim is made of thin metal, or particularly of spring metal. The tubes or band E E or D D F are then placed within the rim, the rim and bands or tubes being of such relative proportions that said tubes are normally retained in proper position within the rim. If the tubes D D and F are used, they or some of them may be inflated if it is desired to secure the air-cushioning effect. They may be inflated by means of the funnels or connecting-tubes, through which air is forced by any proper force-pump. About the rim and between the adjacent tubes within the rim is placed the bearing-tire C, which may itself be a tube or may be of solid material. The weight of the wheel and whatever it supports thus rests upon the bearing-tire C, which is easily removable and which, if made solid and of the shape shown, makes a narrow line of engagement between the wheel and the ground and protects the tubes E E or D D from wear and other injuries which would develop if such tubes rested upon the ground. The tubes are retained in the rim by its overhanging edges or by the lips G G if they are used, and they are also held in position by the bearing-tire C. The bearing-tire C may be elastic and the tubes should be elastic, and the lips G G or overhanging edge of the rim B may also be elastic, if desired. By this means great elasticity is secured. The edge or rather the surface of the tubes E or D is convex and rests upon and engages the concave surface of the rim. Thus there will not be at any time any angle or ridge interposed between the tube and the rim, and hence no danger of injury to the surface of the tube.

When the part B' is used, two sockets, so to speak, are formed for the two tires D D, or for two tires E E if pneumatic tires or tubes are employed. The part B' may be dispensed with, if desired.

The elastic or pneumatic tubes, when used, may be attached to each other, or, indeed, may be formed all of the same piece or fabric; but in any event the parts are related so as in fact to form two or more (more or less) independent tubes or tires. In some cases, however, it may be thought best to use but a single elastic or pneumatic tube with an exterior bearing-tire secured thereon or thereto.

A material part of my invention consists in supporting the weight of the machine on a bearing-tire which may be varied, but is preferably substantially circular in cross-section, and which projects beyond the rim but rests in the groove or trough formed between the two elastic tubes within the rim, so that the elasticity is due both to the elasticity of the tubes themselves and to the tendency of the bearing-tire to move vertically into the groove or trough or between the elastic tubes. By forming the inner surface of the rim so that it presents curved surfaces in which the elastic tubes lie, and particularly by so forming the surface that each tube has a substantially distinct groove in which to lie, the action of the tire is such as to uniformly compress the tubes each in a direction substantially parallel to the bearing radius of such groove, which radius is at an angle to the diameter of the wheel at that point. This secures less wearing and consequently greater protection for such tubes.

I claim—

1. In a tire for bicycle-wheels and the like, the combination of a concave rim with elastic tubes therein, and a bearing-tire projecting beyond the rim lying in the groove or trough formed between the two outer tubes and substantially circular in cross-section.

2. In a tire for bicycle-wheels and the like, the combination of a rim with two elastic tubes therein and a bearing-tire projecting beyond the rim and lying in the groove or trough formed between the two tubes, the inner configuration of the rim being such that the bearing radius of the grooved portion occupied by each tube is substantially in line with the common diameter of its tube and the bearing-tire.

3. In a tire for bicycle-wheels and the like, the combination of a rim outwardly concave but having distinct side grooves or groove-like formations within, with two elastic tubes seated in such grooves, and a bearing-tire projecting beyond such rim but lying in the groove or trough between such tubes.

CHARLES F. JACOBS.

Witnesses:
CELESTE P. CHAPMAN,
HARRIET M. DAY.